INVENTOR
GEOFFREY BATE

BY John F. Ostendorf

ATTORNEY

United States Patent Office 3,512,168

Patented May 12, 1970

3,512,168

APPARATUS FOR RECORDING IN A METASTABLE STATE WITH REVERSION TO A STABLE STATE

Geoffrey Bate, Wappingers Falls, N.Y., assignor to International Business Machines Corporation, a corporation of New York Filed June 30, 1965, Ser. No. 468,356
Int. Cl. G01d *15/12;* G11b *5/00, 11/10*
U.S. Cl. 346—74 2 Claims

ABSTRACT OF THE DISCLOSURE

Apparatus is disclosed in which information is stored in a magnetic medium by the application of either magnetic or thermal force. Magnetic energy is preformed into the magnetic medium by a prerecorded pattern. Application of a magnetic and/or thermal force causes a selected storage location to traverse from a stable to a metastable state wherein the adjacent preformed magnetic forces effect an alteration in orientation at the selected location.

This invention relates to information storage apparatus and, more particularly, to random access storage apparatus having magnetic energy prestored in the apparatus enabling it to be operable in response to minimal externally applied forces.

Storage systems which operate in response to the combined effects of a magnetic field and an environmental force, such as temperature, are well known in the art. Examples of such apparatus are the Curie point and superconductor types of storage systems. Another type of system stores information dependent on the occurrence of a sharp transition in the magnetic properties of the material utilized in the apparatus in response to the combined effects of externally applied magnetic and environmental forces. This type of system is described in pending application, entitled Magnetic Information Storage Apparatus, Ser. No. 458,950, filed May 26, 1965 in the names of Alstad et al., and assigned to the same assignee as this invention, now U.S. Pat. No. 3,453,646.

In all of these types of storage systems, both of the forces necessary to effect information storage must be externally applied to alter the magnetic properties at a selected discrete location of the storage medium. Such arrangements require expensive peripheral equipment having well defined tolerances and predetermined high levels of the forces necessary to change the physical state of the medium to accomplish permanent high density information storage.

Accordingly it is a general object of the invention to provide improved magnetic information storage apparatus.

It is another object of the invention to store information in random access magnetic storage apparatus having magnetic energy prestored in the apparatus that is activated in response to external forces of minimal value.

It is a further object of the invention to provide random access magnetic storage apparatus employing an information storage medium having a rapidly changing magnetization-temperature characteristic defining a first operating region where the manifestations of information storage are permanently unalterable and a second operating region wherein the manifestations are alterable.

A more specific object of the invention is to provide random access magnetic storage apparatus employing an information storage medium having a sharply changing temperature-coercivity characteristic which is actuated from a level of coercivity prestored in the medium in order to store information.

Another more specific object of the invention is to provide such storage apparatus which relies on the use of minimal quantities of temperature and/or magnetic forces to traverse the sharp transition.

In accordance with an aspect of the invention there is provided information storage apparatus comprising means for storing information as magnetic manifestations. The means is characterized by having a sharply changing magnetization-temperature operating curve defining a first region wherein the magnetic manifestations indicative of the information are not capable of being permanently altered. A second region is also defined where recording of information can be accomplished by changing the orientation of the manifestations. Normally, the means is operated at a predetermined temperature and with a value of magnetization that is preformed into the means. Force subjecting means are also provided for applying a minimal quantity of force at a selected discrete location of the information storage means to cause a sharp transition between the operating regions to be traversed to effect the storage of information.

A feature of the invention provides for the use of a magnetic storage medium which may be in tape or film form. Magnetic energy is preformed into the information recording surface of the medium to bias it to a stable magnetic state. The state is maintained just below the level of the sharp transition by maintaining the medium at a predetermined ambient temperature. When the selected discrete location is subjected to an externally applied force of heat and /or a magnetic field, the magnetization-temperature transition is traversed to a metastable operating state. The magnetic energy preformed into the recording surface of the medium effects a change of magnetic orientation at the selected location indicative of the stored information. After the external force is removed, the selected location reverts back to the stable magnetic operating state having a new direction of magnetization opposite to that of the old.

Another feature of the invention provides for an electron beam to supply the energy necessary to effect the change of magnetic state of the selected location. Either the heat from the beam or the magnetic field generated by it is sufficient to cause operation in the metastable state. In either case, the operation is the same. The beam selects the region of the medium and the primary force for accomplishing storage is the magnetic energy preformed in the medium.

The foregoing and other objects, features and advantages of the invention will be apparent from the following more particular description of a preferred embodiment of the invention, as illustrated in the accompanying drawing; wherein.

As previously stated, it is an object of this invention to minimize the forces that must be exerted on a storage medium to bring about the recording of information. This is accomplished by having magnetic energy preformed or prestored in the medium to affect the magnetization properties of the medium. Specifically, the coercivity property of the material may be employed to illustrate this principle.

Figure 1:
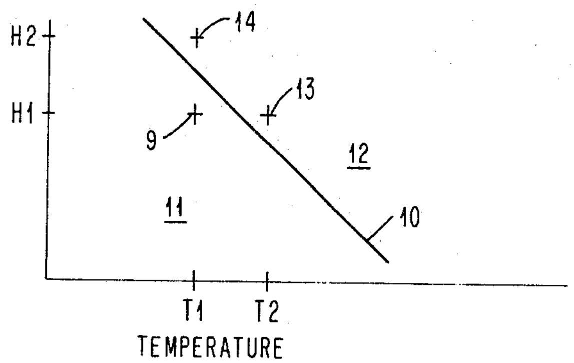
FIG. 1 is a graph illustrating the relationship of temperature and coercivity of a material suitable for use as the storage medium in the apparatus of the invention.

In FIG. 1, a graph illustrates the relative relationship of the temperature and coercivity characteristics of magnetic materials suitable for use in the storage medium of this invention. The coercivity of these materials is inversely related to temperature so as to define a sharply changing characteristic indicated by the diagonal line at 10. In the region 11 below transition line 10, the medium is in its stable state. When in this state, the magnetic properties cannot be permanently changed. The application of either a temperature force or a coercive force, or both, which does not exceed the transition line 10 cannot bring about a permanent change in the magnetization of the medium. However, when the transition line 10 is traversed to the region 12, the medium enters a metastable state and the magnetic properties of the medium are capable of permanent alterations dependent on the direction of the applied coercive force. When the external force is removed the medium reverts back to its original state but with a direction determined by a prestored magnetic force. This force will be described more fully hereinafter.

Thus, if the medium is biased at a particular level of coercivity and a particular level of temperature which closely approaches the transition level 10, only a minimal force is required to accomplish movement over the transition line 10 placing the medium in region 12. In this region, information storage or a change in the magnetic properties of the material can be accomplished. For example, if the medium is operated in the stable state at 9 with a coercivity level indicated as H1 and a temperature level of T1 only a small amount of heat energy is necessary to move the operation of the medium over the transition line 10 to the operating point 13 (H1 T2) in the metastable state. Similarly, only a small amount of magnetic energy is required to move the operation to the point 14 (H2 T1). At either of these operating points 13–14, information may be stored. This is accomplished by preforming or prestoring magnetic energy in the medium so that it operates at the coercivity level of H1 without the application of any externally applied magnetic force.

In a paper delivered at the International Conference on Magnetism, Nottingham, England, September 1964, Bate et al. described the thermomagnetic properties of particles of cobalt substituted gamma ferric oxide ($Co_xFe_{2-x}O_3$) and their temperature dependence in the temperature range of 200° to 400° K. The materials described in this paper are illustrative of those that may be employed in the storage medium to accomplish the principles of the invention. They are characterized by having their coercivity dependent on the magnetic crystalline anisotropy rather than the shape anisotropy.

By way of illustration, if a 2% cobalt substituted ferric oxide ($Co_{0.04}Fe_{1.96}O_3$) is employed and operated at room temperature (the value of T1 of FIG. 1) and if the medium to be used for storage has a field level H1 prerecorded into it, it is known that the coercivity approximates a level of 400 oersteds. In such circumstances, the temperature increase necessary to accomplish a movement beyond the transition line 10 to the point T2 is less than 25°. Similarly, the magnetic force necessary to change the operating point to the level H2 is less than 50 oersteds. As will be explained more fully hereinafter, these forces or a combination of them may be readily supplied by an electron beam.

Figure 2:
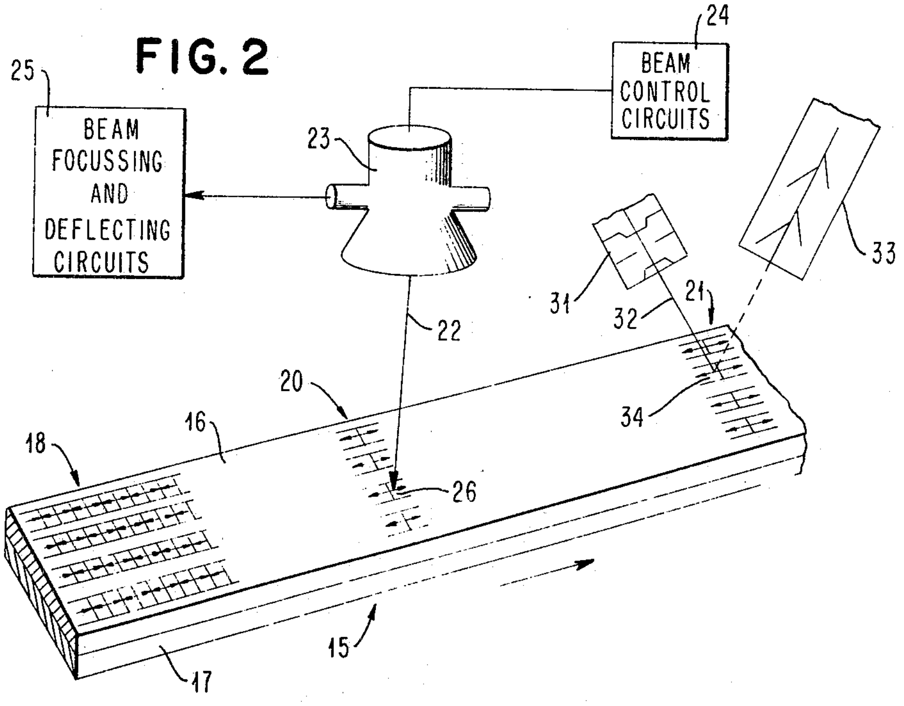
FIG. 2 is a schematic diagram of apparatus employing the principles of the invention.

An information storage system, employing a storage medium having a magnetic material with the temperature dependent properties described above, is shown in FIG. 2. The magnetic information storage medium may be in tape form as indicated at 15, comprising a layer of magnetic material 16. The layer 16 is deposited by conventional methods on a smooth substrate 17. The thickness of the layer 16 should be less than 100 microinches and preferably have a thickness of from 20 to 50 microinches. When such a layer of magnetic material is employed, the thickness of the substrate 17 approximates ⅛ to ¼ of an inch. The substrate may be rigid and formed from a polished metal or glass. If the magnetic storage medium is to be flexible, a polycarbonate substrate may be utilized. The layer may also take the form of a thermoplastic material having particles such as iron, cobalt or nickel, or any alloys of these particles deposited in it. The particles would be packed so that no less than 40% of the volume of the thermoplastic material would be the particles. The storage medium could also take the form of a nickel-iron thin film.

The magnetic layer 16 has a pattern 18 of information prerecorded on it. The particular pattern illustrated is commonly referred to as an NRZI "all ones pattern." This pattern can be recorded at a prerecording station (not shown) or the tape may be manufactured in this form. As the tape moves relatively in the direction of the arrow, a recording station 20 is encountered. Thereafter, the tape passes a read out station 21.

At the recording station 20 a beam of electrons 22 is directed at the prerecorded pattern 18 on the tape 15. The beam of electrons 22 is generated by an electron gun 23 having appropriate beam control circuits 24 and beam focusing and deflecting circuits 25.

Beam 22 is directed at a selected discrete location 26. It carries sufficient heat and/or magnetic field generated by the electrons to cause the sharp transition 10 of FIG. 1 to be traversed, switching operation of the layer 16 at location 26 from the stable state 11 to the metastable state 12. When this occurs, the magnetic orientation at the selected location 26 may be changed from that of the prerecorded pattern. In this invention, the new orientation of the selected location is determined by the magnetic energy prestored in layer 16 by the prerecorded pattern 18. The manner in which the prerecorded pattern acts to control the new orientation of the location will be described more fully hereinafter.

At the read out station 21, the Kerr effect may be employed for read out of the information. A source of light 31 provides a beam 32 that is directed at the tape as it passes the reading station 21. By employing a detector 33 to measure the light reflections which depend on the magnitude and sense of magnetization at a given location, for example, at 34, an indication is provided of the information stored at that location.

As the tape 15 is capable of transmitting light, the Faraday effect may be employed for read out purposes to measure the deflections of the light passing through the tape. In such an instance, the tape would be required to be of the thin film variety having a clear substrate. Additionally, the read out system may employ electron beam detection. The source of the electron beam may be the same as the beam employed for recording the information or it may be a different source. The measurements that are made may be performed by electron mirror techniques or those of Lorenz microscopy. Regardless of the type of read out employed, it should be noted, however, that the read out does not have to take place immediately after recording. The tape may be stored and read out performed at a subsequent time.

Figure 3:
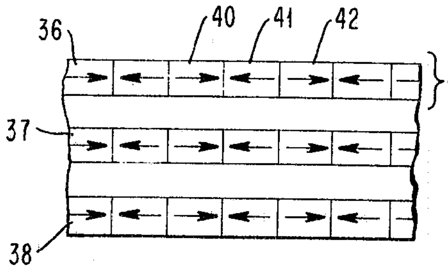
FIG. 3 is a diagram of a portion of the recording surface of the storage medium.

Referring now to FIG. 3, a portion of the prerecorded pattern 18 on the magnetic tape 15 includes the tracks 36, 37, 38. As already stated, this pattern may be formed on the tape during its processing or it may be formed at a prerecording station using a conventional magnetic head. Pre-energization takes place in the layer 16 of magnetic material, so that only a minimal amount of externally applied force or energy is necessary to activate the material for the storage of information.

Each of the tracks 36–38 may have a width between 50 and 100 mils and preferably about 0.060 inch. Each track is divided into a plurality of regions such as the regions 40, 41 and 42 of the track 36. Each of these regions may have a width of about 0.0001 inch. Alternate regions are magnetized in opposite directions in the pre-energization of the tape. Thus, the north poles of the domains of adjacent neighboring vertical rows confront each other. Similarly, the south poles of neighboring rows confront each other.

Figure 4:
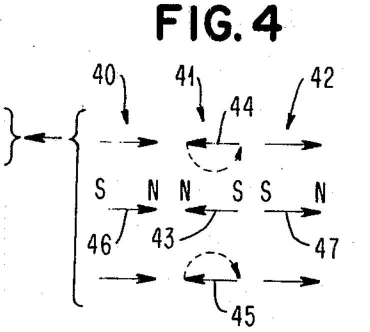
FIGS. 4 and 5 are enlarged views of certain portions of the recording surface of FIG. 3 illustrating the condition of a storage location immediately before and immediately after information is stored at the location.
Figure 5:
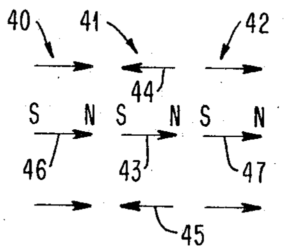

A portion of each of the regions 40–42 is illustrated in FIGS. 4 and 5 indicating the orientation of the areas or sub-regions within the region before and after information storage has taken place. Thus, the columns correspond to the orientation of some of the sub-regions in the regions 40–42. In actuality many more sub-regions would be in each column. The prerecorded pattern provides for the sub-regions of adjacent columns to be recorded in opposite direction. The north poles of neighboring sub-regions confront each other and the south poles of neighboring sub-regions similarly confront each other. In this configuration the magnetic forces exerted are naturally of the repelling type.

For example, with the north poles of the columns in regions 40 and 42 facing in the right direction and the north poles of the columns in region 41 in the left direction, the sub-region 43 in column 41 has repelling forces exerted against it by the surrounding sub-regions 46 and 47. The sub-regions 44 and 45 in the column of region 41 exert the forces shown by the dotted lines. It is this pre-energization of the magnetic material which establishes a particular bias level, such as the level H1 of FIG. 1, for the tape 15.

When a slight external force is exerted on the sub-region 43 and the layer 16 is operated at the temperature T1, the transition line 10 is traversed to the metastable state 12. The prestored energy brings about a change of orientation of the sub-region 43 according to the magnetostatic forces acting on it. This aspect of operation is shown in FIG. 5. The sub-region 43 is completely reversed in orientation, indicating information that is stored. The force necessary to bring this reversal of orientation has come from the surrounding sub-regions 44–47. It is operative only when the selected sub-region 43 is in the metastable state 12 of its coercivity-temperature characteristic. As already stated, this is accomplished in the apparatus of FIG. 2 by the electron beam 22. Beam 22 identifies the sub-regions where information is to be stored but the switching forces are exerted by the prestored recording pattern.

In actual practice an addition of a magnetic field of 0.01 to 0.1 oersted is required to bring about the traversal of transition line 10 for a thin nickel-iron film having a thickness of approximately 600 A. (2–5 microinches) and a prestored coercivity of 50 oersteds or less. On the other hand, if a change in temperature is employed to bring about the switching action, then a temperature change of only 5° C. is required. If the material of layer 16 is thicker, in the order of 100 microinches, it operates at a prestored coercivity level of 400 oersteds, and it requires a change of approximately 25° C. in temperature. In either case, the force applied to cause the switching action is chosen for the particular material, so that it is high enough to bring about the change from state 11 to state 12 but is not self-erasing.

The heat energy supplied by the source of electrons 23 is adequate to cause the switching action to occur. The beam of electrons 22 in the apparatus of FIG. 2 from source 23 is also sufficient to provide an increase in the level of the magnetic field at a particular region of the material to cause the switching to occur in this manner. It should also be understood that heat could be applied by another means such as a laser beam or current-carrying wire or wires, and that magnetic energy could be supplied by an externally applied field acting in a direction different from that of the orientation of the prerecorded pattern.

In the operation of this information storage apparatus it should be noted that not every area or sub-region on the tape is switched, for some sub-regions are required to provide the reversing forces. The highest practical density of information storage involves the use of about half the total number of sub-regions in a region of the tape. A sub-region corresponds to the cross-sectional area of the beam of electrons. The possible information storage density obtainable when an "all ones pattern" is prerecorded on the tape approximates $10^8$ bits of information per square inch. This occurs since the "all ones pattern" is recorded at a density exceeding $10^4$ bits per inch, and the electron beam has a cross-sectional area which is less than $10^{-4}$ inches. Other types of prerecording schemes may be employed. However, the storage densities involved would be less than those indicated above.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Information storage apparatus comprising:

a sheet of magnetic material pre-biased into an all ones NRZI recording pattern for storing information as magnetic manifestations, the material having the property of a sharp switching transition in coercivity with change in temperature defining a stable state and a metastable state.

said sheet normally being in the stable state when operative and at predetermined levels of temperature and coercivity, the coercivity level being determined by said all ones NRZI recording pattern;

digital pre-biasing means for establishing an all ones NRZI recording pattern on said sheet in a direction parallel to the plane of said sheet; and electron beam means for altering both temperature level and coercivity level at a selected discrete location of the storage means so as to exceed the sharp switching transition from the stable state to the metastable operating state permitting said all ones NRZI recording pattern to effect storage of information at said location by altering a magnetic manifestation.

2. A method for recording information in a cobalt substituted ferric oxide magnetic medium comprising the steps of:

maintaining said medium at a predetermined ambient temperature just below a transition from a stable state to a metastable state;

recording a digital all ones NRZI pattern on said medium in a direction parallel to the plane of said medium;

applying heat energy to a selected discrete location on said medium to cause traversal of said medium from said stable state to said metastable state; thereby allowing the magnetostatic energy stored in said medium by said prerecorded digital all ones NRZI pattern to switch the magnetic orientation at said selected discrete location.

References Cited

UNITED STATES PATENTS

| | | | |
|---|---|---|---|
| 2,857,458 | 10/1958 | Sziklai | 346—74 |
| 2,952,503 | 9/1960 | Becker | 346—74 |
| 3,094,699 | 6/1963 | Supernowicz | 346—74 |
| 3,176,278 | 3/1965 | Mayer | 346—74 |
| 3,287,709 | 11/1966 | Moulton | 340—174 |
| 3,113,297 | 12/1963 | Dietrich | 340—174 |
| 3,164,816 | 1/1965 | Chang | 346—74 |
| 3,343,174 | 9/1967 | Kornei | 346—74 |

BERNARD KONICK, Primary Examiner

U. P. CANNEY, Assistant Examiner

U.S. Cl. X.R.

340—174.1